United States Patent
Moore et al.

(10) Patent No.: US 9,806,585 B2
(45) Date of Patent: Oct. 31, 2017

(54) ELECTROMAGNETIC ROTOR DRIVE ASSEMBLY

(71) Applicant: RK Transportation Solutions LLC, Loveland, CO (US)

(72) Inventors: Randall Jay Moore, Loveland, CO (US); Kevin Paul Moore, Loveland, CO (US)

(73) Assignee: RK Transportation Solutions LLC, Loveland, CO (US)

( * ) Notice: Subject to any disclaimer, the term of this patent is extended or adjusted under 35 U.S.C. 154(b) by 0 days.

(21) Appl. No.: 15/311,808

(22) PCT Filed: May 15, 2015

(86) PCT No.: PCT/US2015/031230
§ 371 (c)(1),
(2) Date: Nov. 16, 2016

(87) PCT Pub. No.: WO2015/187346
PCT Pub. Date: Dec. 10, 2015

(65) Prior Publication Data
US 2017/0093246 A1     Mar. 30, 2017

Related U.S. Application Data

(60) Provisional application No. 62/006,778, filed on Jun. 2, 2014.

(51) Int. Cl.
*H02K 7/04*       (2006.01)
*H02K 7/00*       (2006.01)
(Continued)

(52) U.S. Cl.
CPC .............. *H02K 7/006* (2013.01); *B60K 6/24* (2013.01); *B60K 6/26* (2013.01); *B60K 6/485* (2013.01);
(Continued)

(58) Field of Classification Search
CPC . H02K 7/04; H02K 7/02; H02K 7/075; B60K 6/20; B60K 6/26; B60K 6/485
See application file for complete search history.

(56) References Cited

U.S. PATENT DOCUMENTS 804,371 A       11/1905   Behan
2,715,685 A *   8/1955    Brown .................... F04B 35/04
                                                    290/1 A
(Continued)

FOREIGN PATENT DOCUMENTS

EP        1055816      11/2000

OTHER PUBLICATIONS

U.S. Appl. No. 62/006,778, filed Jun. 2, 2014.
(Continued)

*Primary Examiner* — Dang Le
(74) *Attorney, Agent, or Firm* — Craig R. Miles; CR Miles P.C.

(57) ABSTRACT

An electromagnetic rotor drive assembly for use with an internal combustion engine, the electromagnetic rotor drive assembly including a conductive coil capable of generating a magnetic field upon energization; a rotor rotatably mounted proximate the conductive coil; and a magnet coupled to the rotor, the magnet responsive to the magnetic field to angularly displace the rotor; whereby the rotor fixedly couples to a crankshaft rotated by at least one piston reciprocally disposed within a cylinder; and whereby the conductive coil is energized at a predetermined time point associated with a position of the piston within the cylinder.

21 Claims, 15 Drawing Sheets

(51) Int. Cl.

| | | |
|---|---|---|
| *B60K 6/26* | (2007.10) | |
| *B60K 6/24* | (2007.10) | |
| *B60K 6/485* | (2007.10) | |
| *F02B 75/02* | (2006.01) | |
| *F02B 75/12* | (2006.01) | |
| *F02B 73/00* | (2006.01) | |
| *F02B 61/00* | (2006.01) | |
| *F02B 75/06* | (2006.01) | |
| *F16F 15/18* | (2006.01) | |
| *H02K 7/02* | (2006.01) | |
| *H02K 7/075* | (2006.01) | |
| *H02K 1/27* | (2006.01) | |
| *H02K 3/18* | (2006.01) | |
| *B60L 11/18* | (2006.01) | |

(52) U.S. Cl.
CPC .............. *B60L 11/18* (2013.01); *F02B 61/00* (2013.01); *F02B 73/00* (2013.01); *F02B 75/02* (2013.01); *F02B 75/06* (2013.01); *F02B 75/12* (2013.01); *F16F 15/18* (2013.01); *H02K 1/2793* (2013.01); *H02K 3/18* (2013.01); *H02K 7/02* (2013.01); *H02K 7/075* (2013.01); *B60Y 2200/92* (2013.01); *B60Y 2400/60* (2013.01); *F02B 2075/027* (2013.01)

(56) References Cited

U.S. PATENT DOCUMENTS

| | | | |
|---|---|---|---|
| 4,369,384 A * | 1/1983 | Nardi | H02K 7/1815 310/156.32 |
| 4,486,675 A | 12/1984 | Albert | |
| 4,785,228 A | 11/1988 | Goddard | |
| 4,864,199 A | 9/1989 | Dixon | |
| 4,873,962 A | 10/1989 | Safranek | |
| 5,258,697 A | 11/1993 | Ford et al. | |
| 5,428,282 A | 6/1995 | Johnson | |
| 5,461,289 A | 10/1995 | Adler et al. | |
| 5,514,923 A | 5/1996 | Gossler et al. | |
| 5,796,195 A * | 8/1998 | Miyakawa | B60K 6/26 310/216.009 |
| 6,232,681 B1 * | 5/2001 | Johnston | H02K 1/12 29/596 |
| 6,407,466 B2 * | 6/2002 | Caamano | H02K 1/02 290/52 |
| 6,720,688 B1 | 4/2004 | Schiller | |
| 6,938,713 B1 | 9/2005 | Tahara et al. | |
| 7,105,972 B2 | 9/2006 | Gallant | |
| 8,247,940 B2 * | 8/2012 | Hino | H02K 1/276 310/156.47 |
| 8,350,502 B2 | 1/2013 | Rabal | |
| 2007/0227470 A1 | 10/2007 | Cole et al. | |
| 2008/0110293 A1 | 5/2008 | Clausin | |

OTHER PUBLICATIONS

International Patent Cooperation Treaty Patent Application No. PCT/US15/31230, filed May 15, 2015,.

International PCT Patent Application No. PCT/US15/31230; International Search Report and the Written Opinion of the International Search Authority, dated Aug. 21, 2015, 13 pages.

* cited by examiner

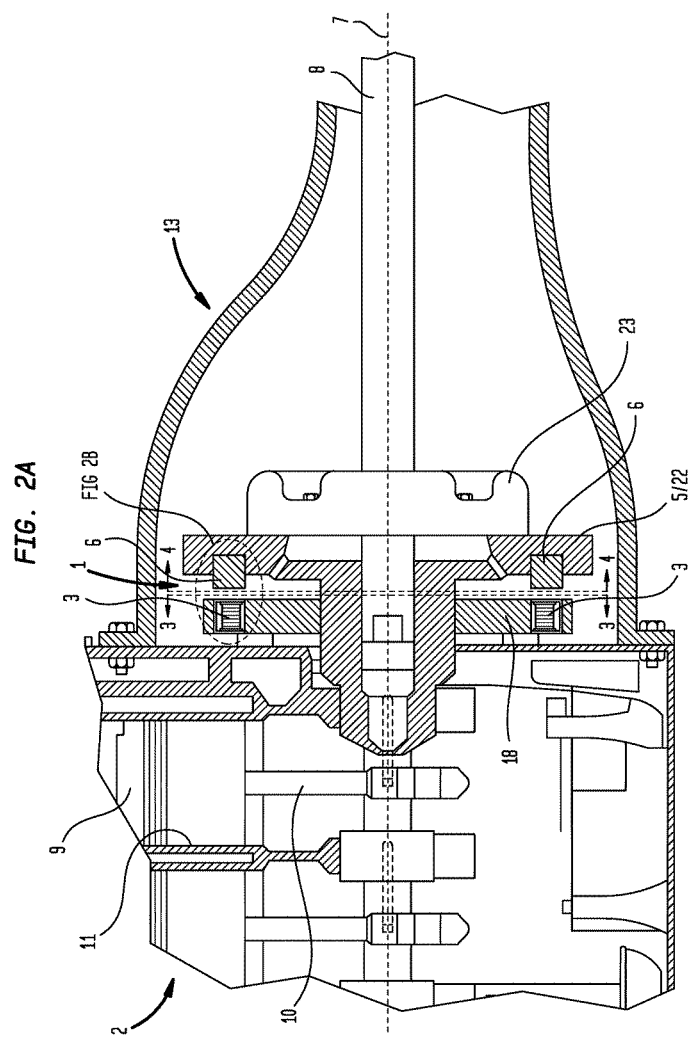

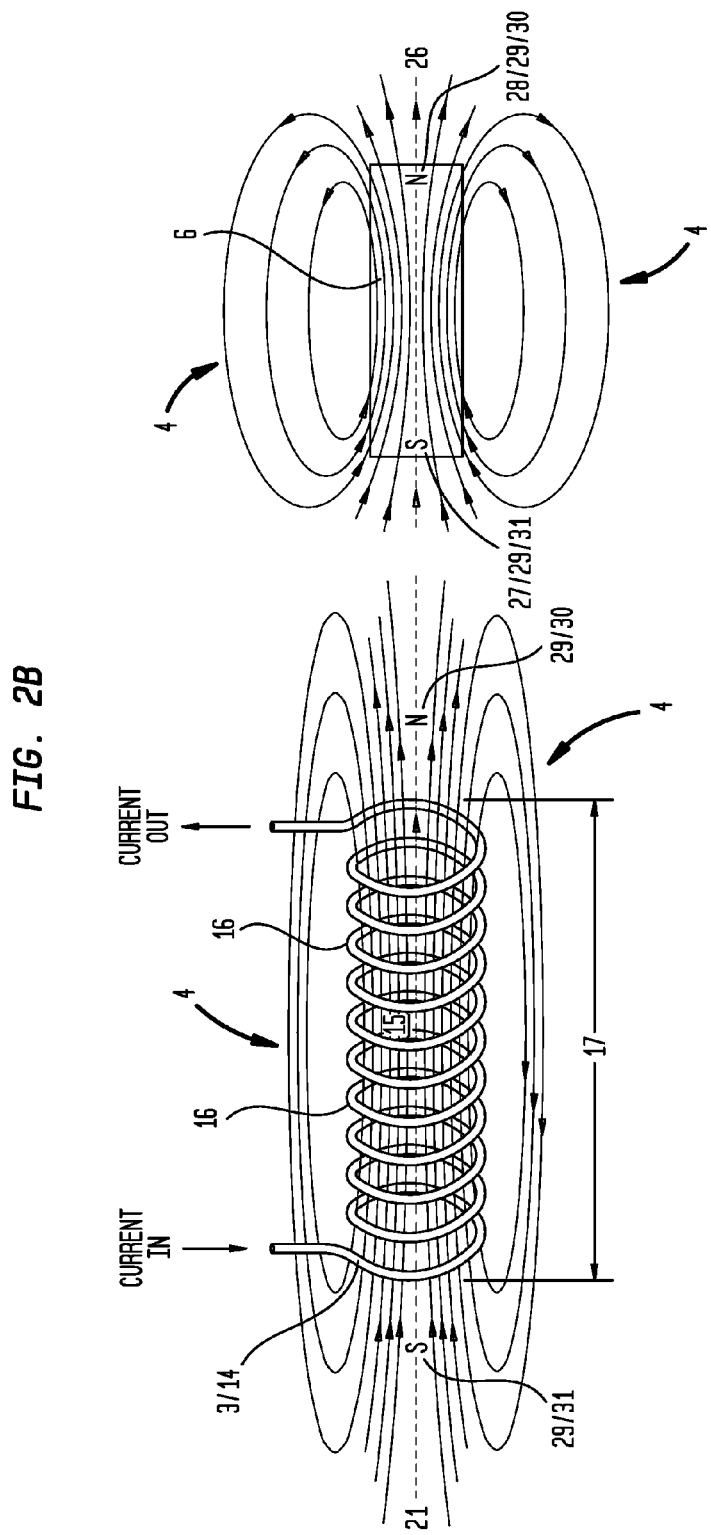

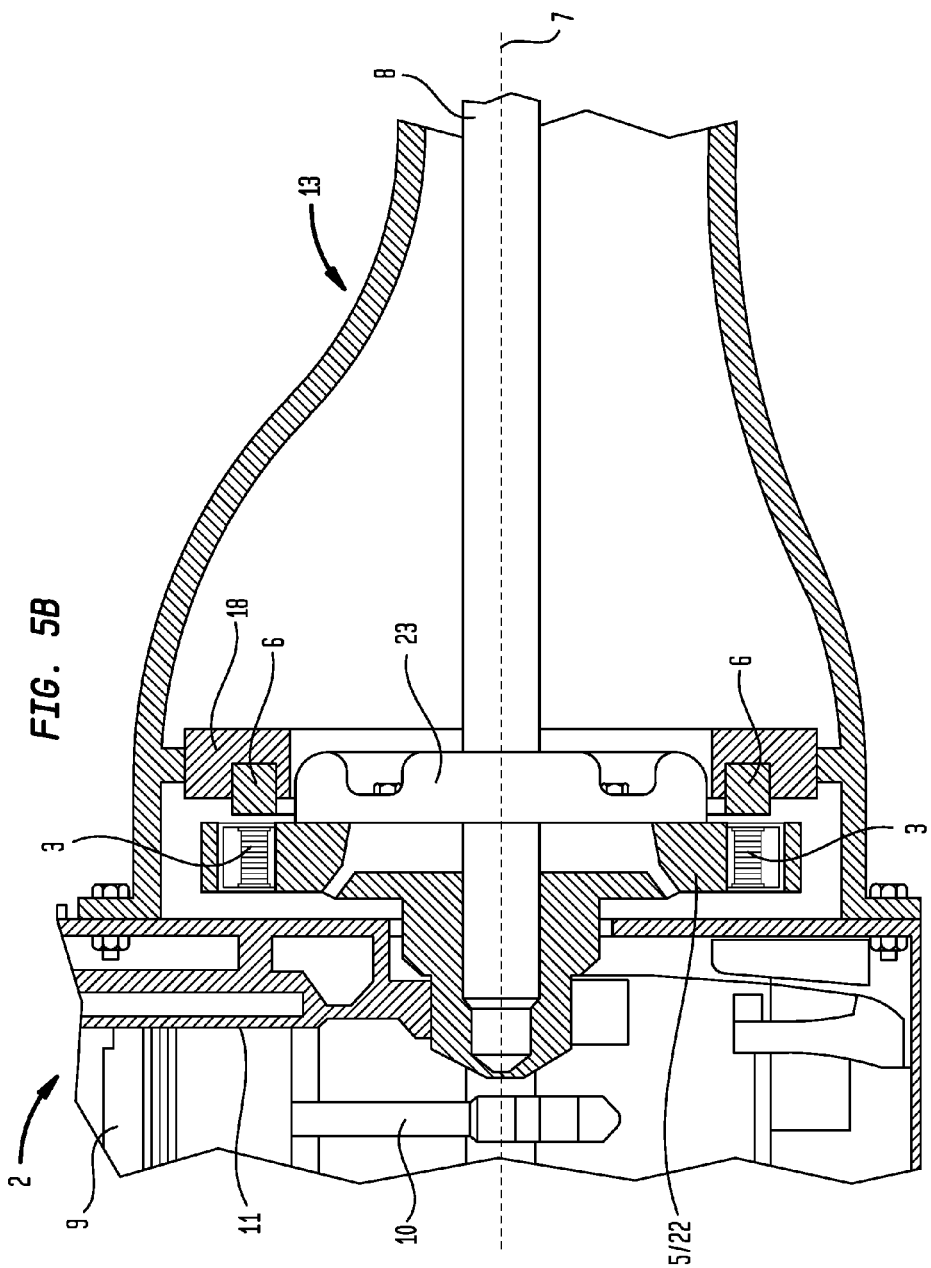

us 9,806,585 B2

ELECTROMAGNETIC ROTOR DRIVE ASSEMBLY

This application is the United States National Stage of International Patent Cooperation Treaty Patent Application No. PCT/US15/31230, filed May 15, 2015, which claims the benefit of U.S. Provisional Patent Application No. 62/006,778, filed Jun. 2, 2014, each hereby incorporated by reference herein.

I. BACKGROUND

A need exists for an assembly which can provide additional energy input into an internal combustion engine, whereby the additional energy input is derived from an alternative energy source, such as electromagnetic energy.

II. DISCLOSURE OF THE INVENTION

Accordingly, a broad object of a particular embodiment of the invention can be to provide an electromagnetic rotor drive assembly for use with an internal combustion engine, the electromagnetic rotor drive assembly including a conductive coil capable of generating a magnetic field upon energization; a rotor rotatably mounted proximate the conductive coil; and a magnet coupled to the rotor, the magnet responsive to the magnetic field to angularly displace the rotor; whereby the rotor fixedly couples to a crankshaft rotated by at least one piston reciprocally disposed within a cylinder; and whereby the conductive coil is energized at a predetermined time point associated with a position of the piston within the cylinder.

Another broad object of a particular embodiment of the invention can be to provide a method of making an electromagnetic rotor drive assembly for use with an internal combustion engine, the method including providing a conductive coil capable of generating a magnetic field upon energization; rotatably mounting a rotor proximate the conductive coil; and coupling a magnet to the rotor, the magnet responsive to the magnetic field to angularly displace the rotor; whereby the rotor fixedly couples to a crankshaft rotated by at least one piston reciprocally disposed within a cylinder; and whereby the conductive coil is energized at a predetermined time point associated with a position of the piston within the cylinder.

Another broad object of a particular embodiment of the invention can be to provide a method of using an electromagnetic rotor drive assembly to provide additional energy input into an internal combustion engine, the method including obtaining the electromagnetic rotor drive assembly comprising a conductive coil capable of generating a magnetic field upon energization; a rotor rotatably mounted proximate the conductive coil; and a magnet coupled to the rotor, the magnet responsive to the magnetic field to angularly displace the rotor; whereby the rotor fixedly couples to a crankshaft rotated by at least one piston reciprocally disposed within a cylinder; and whereby the conductive coil is energized at a predetermined time point associated with a position of the piston within the cylinder; and energizing the conductive coil at the predetermined time point associated with the position of the piston within the cylinder.

Naturally, further objects of particular embodiments of the invention are disclosed throughout other areas of the specification, drawings, and claims.

III. BRIEF DESCRIPTION OF THE DRAWINGS

FIG. 2A is an enlarged cross-sectional view of the particular embodiment of the electromagnetic rotor drive assembly shown in FIG. 1, whereby a plurality of conductive coils capable of generating corresponding magnetic fields upon energization are coupled to a stator and a plurality of magnets are coupled to a rotor.

Figure 3:
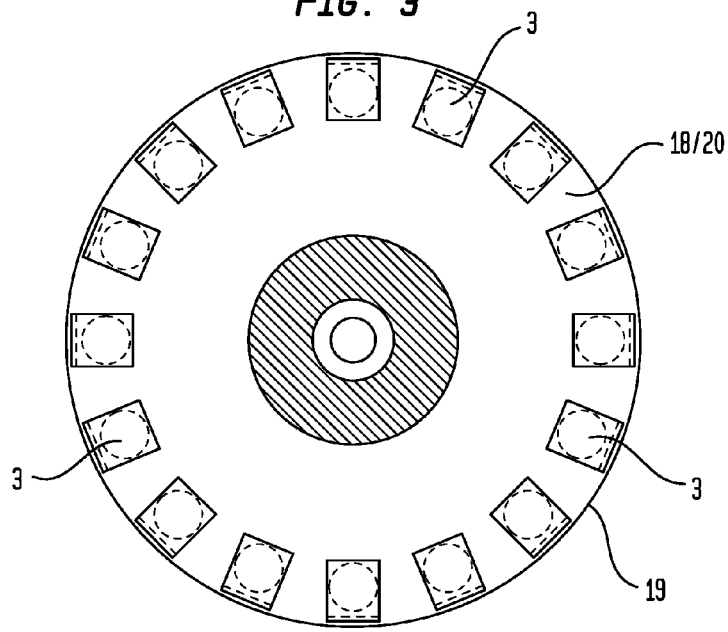

FIG. 2B is an illustration of magnetic field generated by a conductive coil interacting with a magnetic field of a magnet, in accordance with a particular embodiment of an electromagnetic rotor drive assembly FIG. 3 is a cross-sectional view 3-3 of the particular embodiment of the electromagnetic rotor drive assembly shown in FIG. 2A, whereby a plurality of conductive coils capable of generating corresponding magnetic fields upon energization are coupled to a stator.

Figure 4:
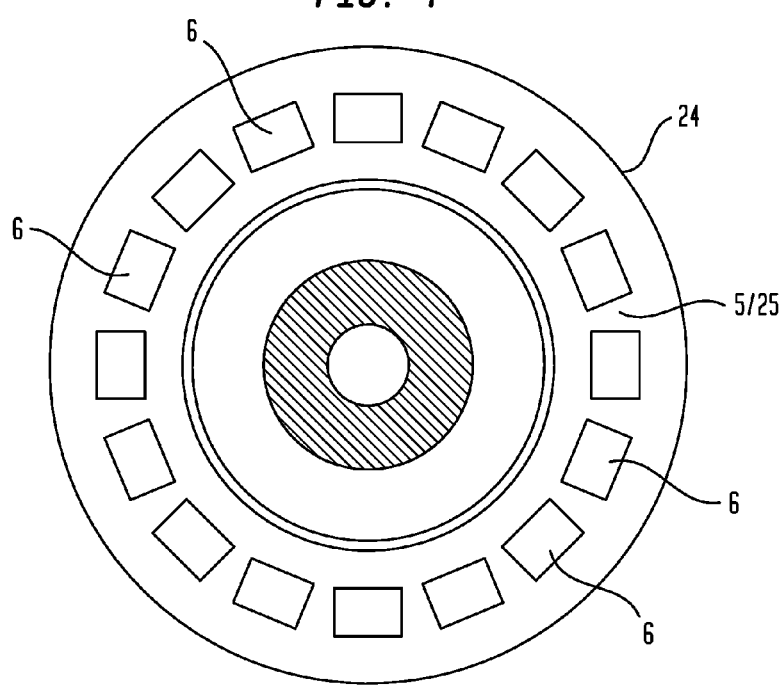

FIG. 4 is a cross-sectional view 4-4 of the particular embodiment of the electromagnetic rotor drive assembly shown in FIG. 2A, whereby a plurality of magnets are coupled to a rotor.

Figure 5A:
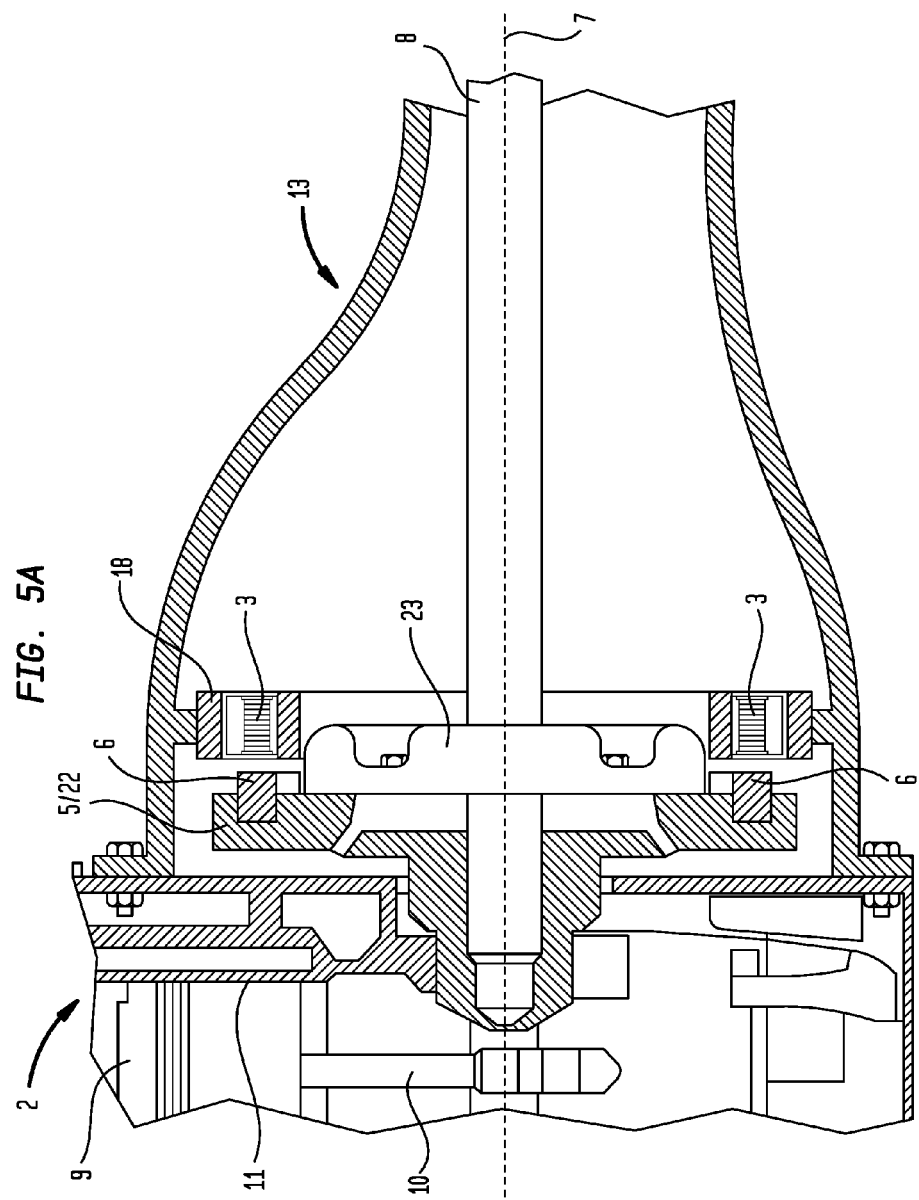

FIG. 5A is a cross-sectional view of a particular embodiment of an electromagnetic rotor drive assembly used with an internal combustion engine, whereby a plurality of conductive coils capable of generating corresponding magnetic fields upon energization are coupled to a stator and a plurality of magnets are coupled to a rotor, and whereby the rotor is disposed proximate an engine block.

FIG. 5B is a cross-sectional view of a particular embodiment of an electromagnetic rotor drive assembly used with an internal combustion engine, whereby a plurality of conductive coils capable of generating corresponding magnetic fields upon energization are coupled to a rotor and a plurality of magnets are coupled to a stator, and whereby the rotor is disposed proximate an engine block.

Figure 5C:
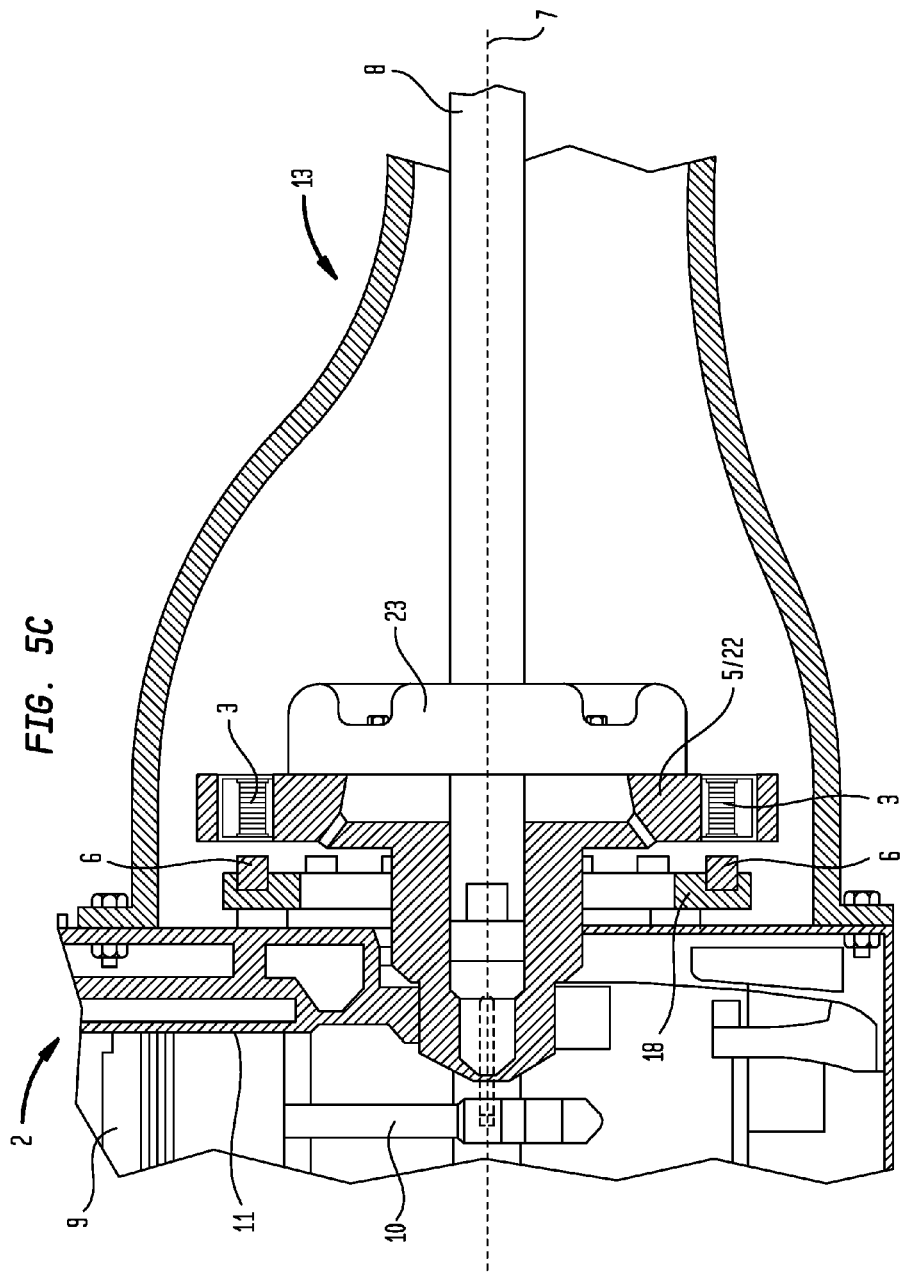

FIG. 5C is a cross-sectional view of a particular embodiment of an electromagnetic rotor drive assembly used with an internal combustion engine, whereby a plurality of conductive coils capable of generating corresponding magnetic fields upon energization are coupled to a rotor and a plurality of magnets are coupled to a stator, and whereby the stator is disposed proximate an engine block.

Figure 6:
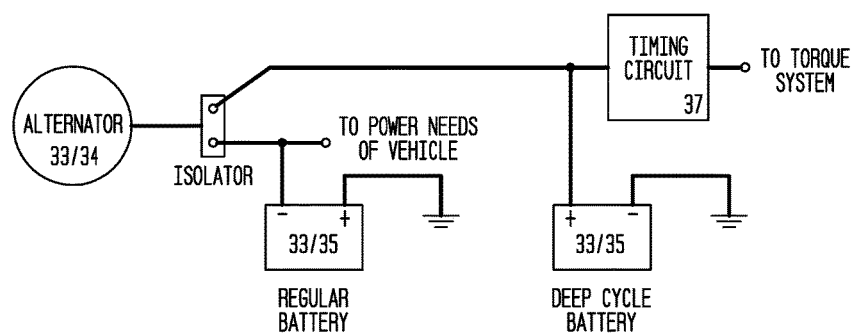

FIG. 6 is an illustration of a circuit for powering a particular embodiment of an electromagnetic rotor drive assembly.

Figure 7:
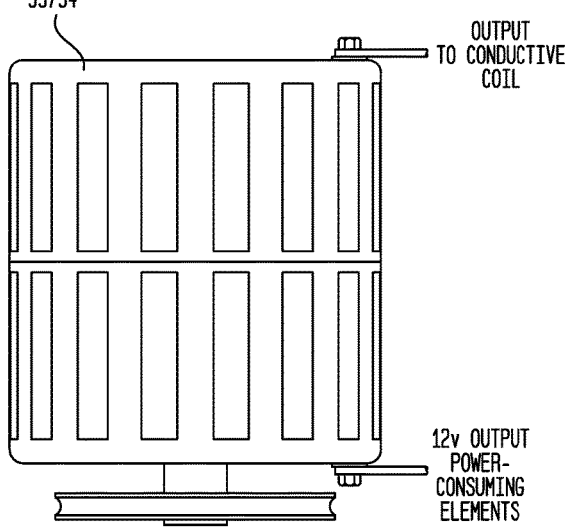

FIG. 7 is a view of a power source useful for powering a particular embodiment of an electromagnetic rotor drive assembly.

Figure 8:
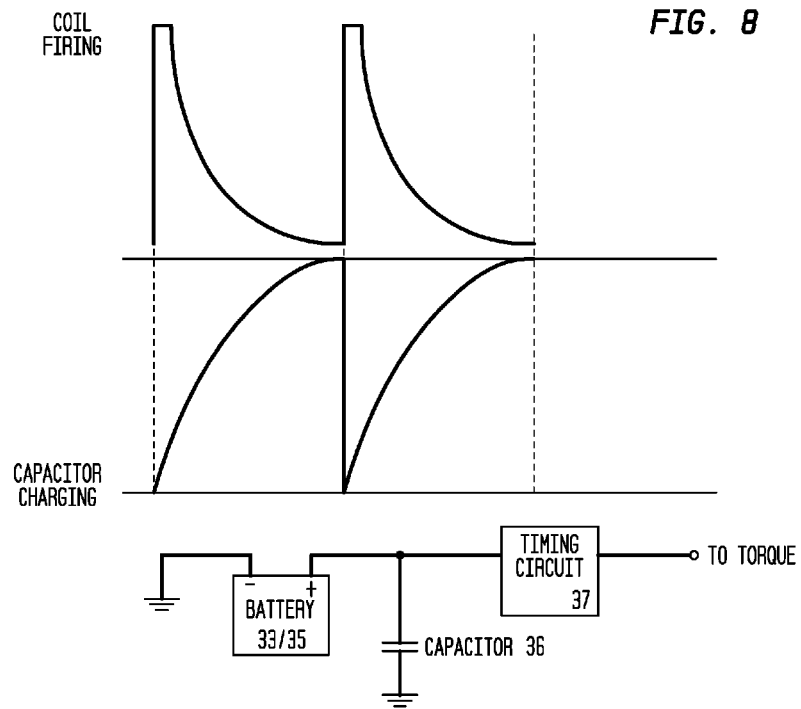

FIG. 8 is an illustration of a circuit and an energy profile for powering a particular embodiment of an electromagnetic rotor drive assembly.

Figure 9:
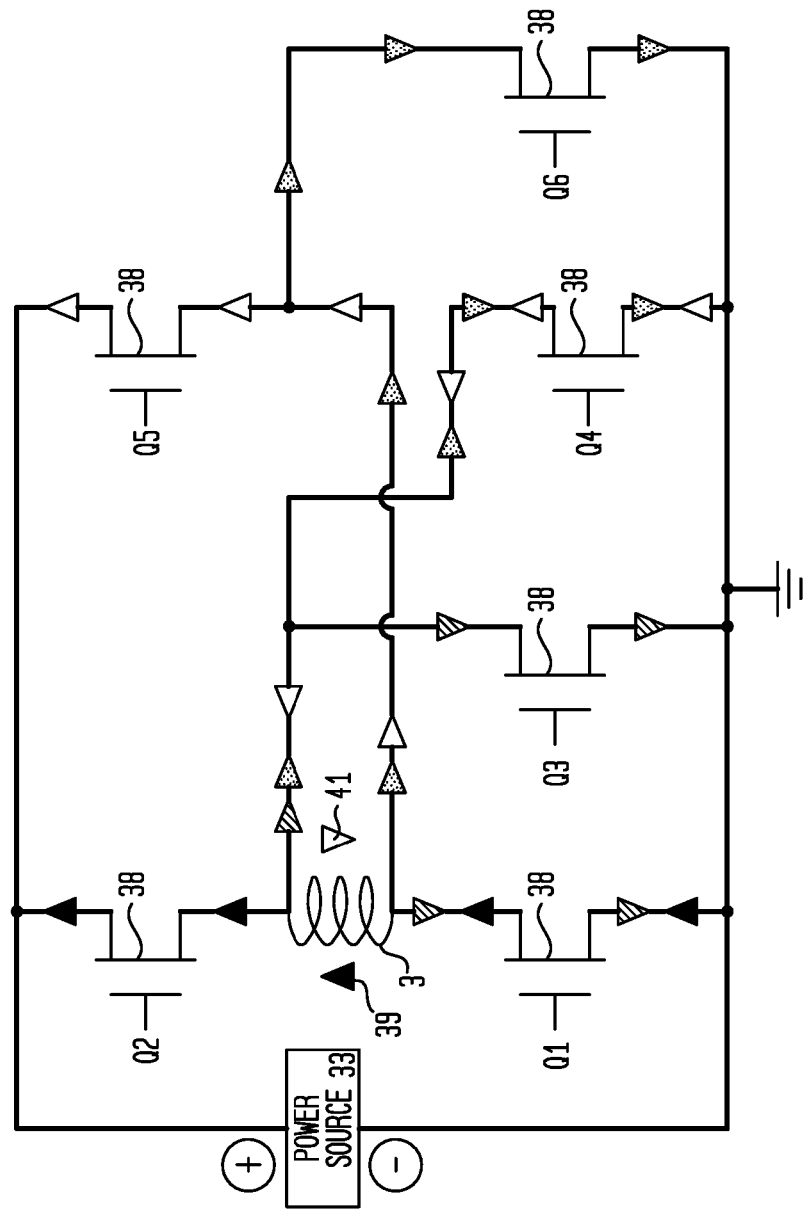

FIG. 9 is an illustration of a timing circuit which may be used with a particular embodiment of an electromagnetic rotor drive assembly to interruptably pass electric current through a conductive coil to time energization of the conductive coil and correspondingly, to generate a magnetic field.

Figure 10A:
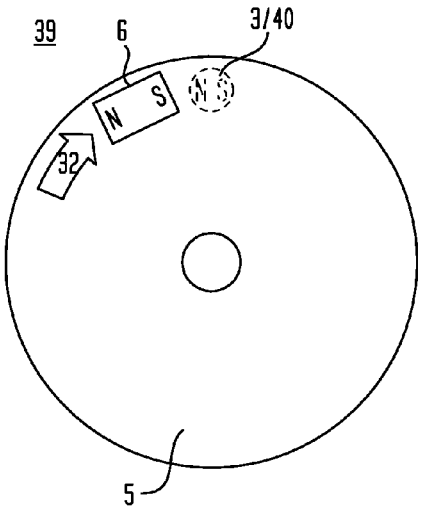

FIG. 10A is an illustration of electric current passing through a conductive coil in an electric current flow first direction to generate a magnetic pole first direction, whereby a north magnetic pole of the magnetic field generated by the conductive coil attracts a south magnetic pole of a magnet traveling in a rotational travel path toward the conductive coil to angularly displace a rotor, thereby accelerating rotation of the rotor about a rotation axis, until the magnet aligns with the conductive coil.

Figure 10B:
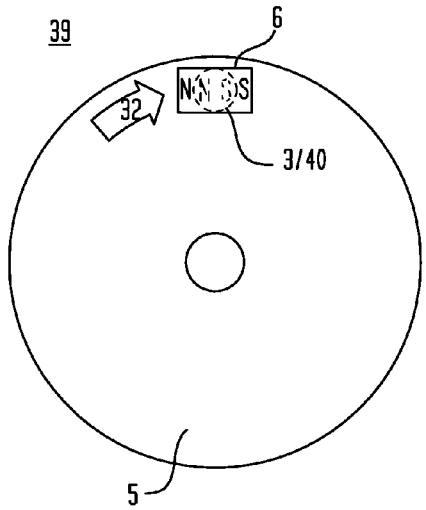

FIG. 10B is an illustration of electric current passing through a conductive coil in an electric current flow first direction to generate a magnetic pole first direction, whereby a magnet traveling in a rotational travel path aligns with the conductive coil.

Figure 10C:
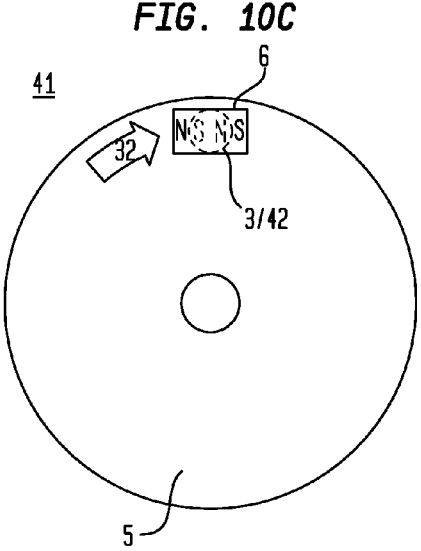

FIG. 10C is an illustration of electric current passing through a conductive coil in an electric current flow second direction to generate a magnetic pole second direction, whereby a magnet traveling in a rotational travel path aligns with the conductive coil.

Figure 10D:
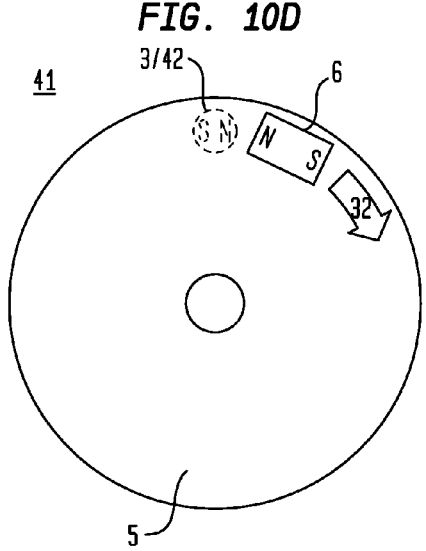

FIG. 10D is an illustration of electric current passing through a conductive coil in an electric current flow second direction to generate a magnetic pole second direction, whereby a north magnetic pole of the magnetic field generated by the conductive coil repels a north magnetic pole of a magnet traveling in a rotational travel path away from the conductive coil to angularly displace a rotor, thereby accelerating rotation of the rotor about a rotation axis, until the magnet exits the magnetic field generated by the conductive coil.

Figure 11A:
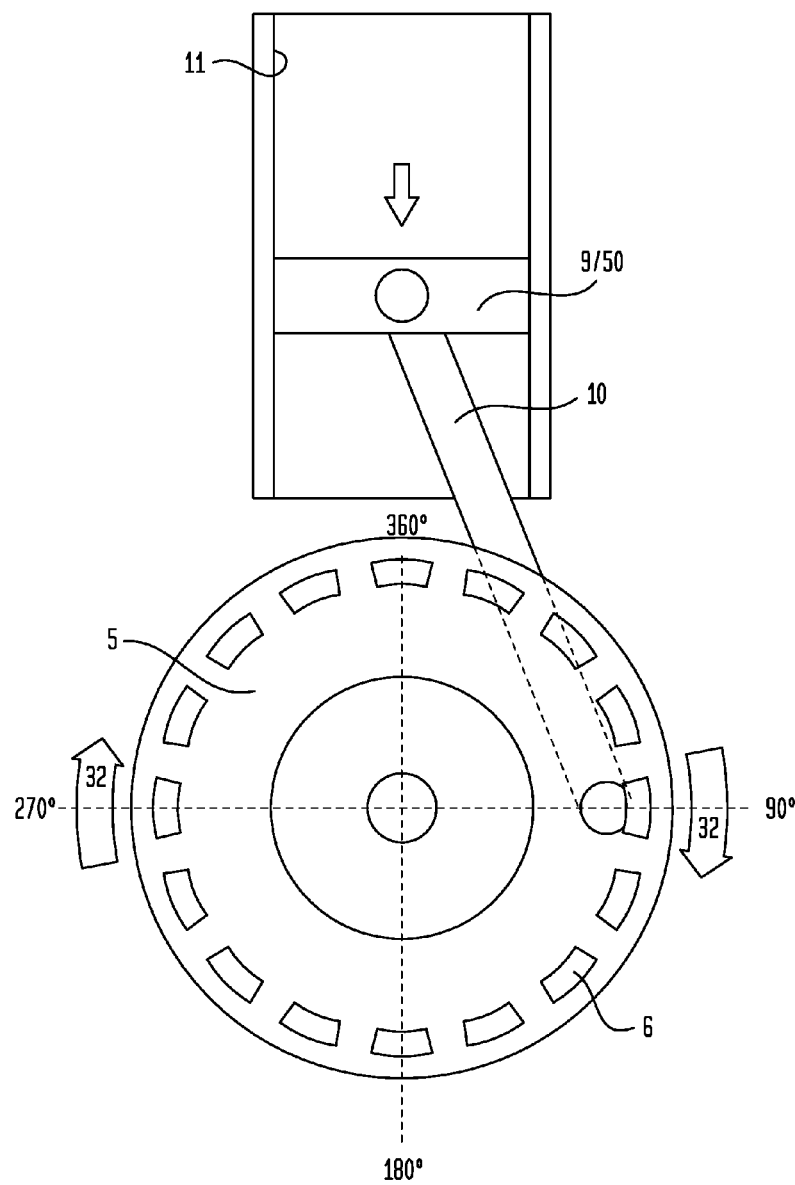

FIG. 11A is an illustration of a midway point of an intake stroke of a four-stroke engine, whereby a piston within a cylinder begins at about a top dead center position and ends at about a bottom dead center position, during which a crankshaft and associated rotor travel from about 0° to about 180°.

Figure 11B:
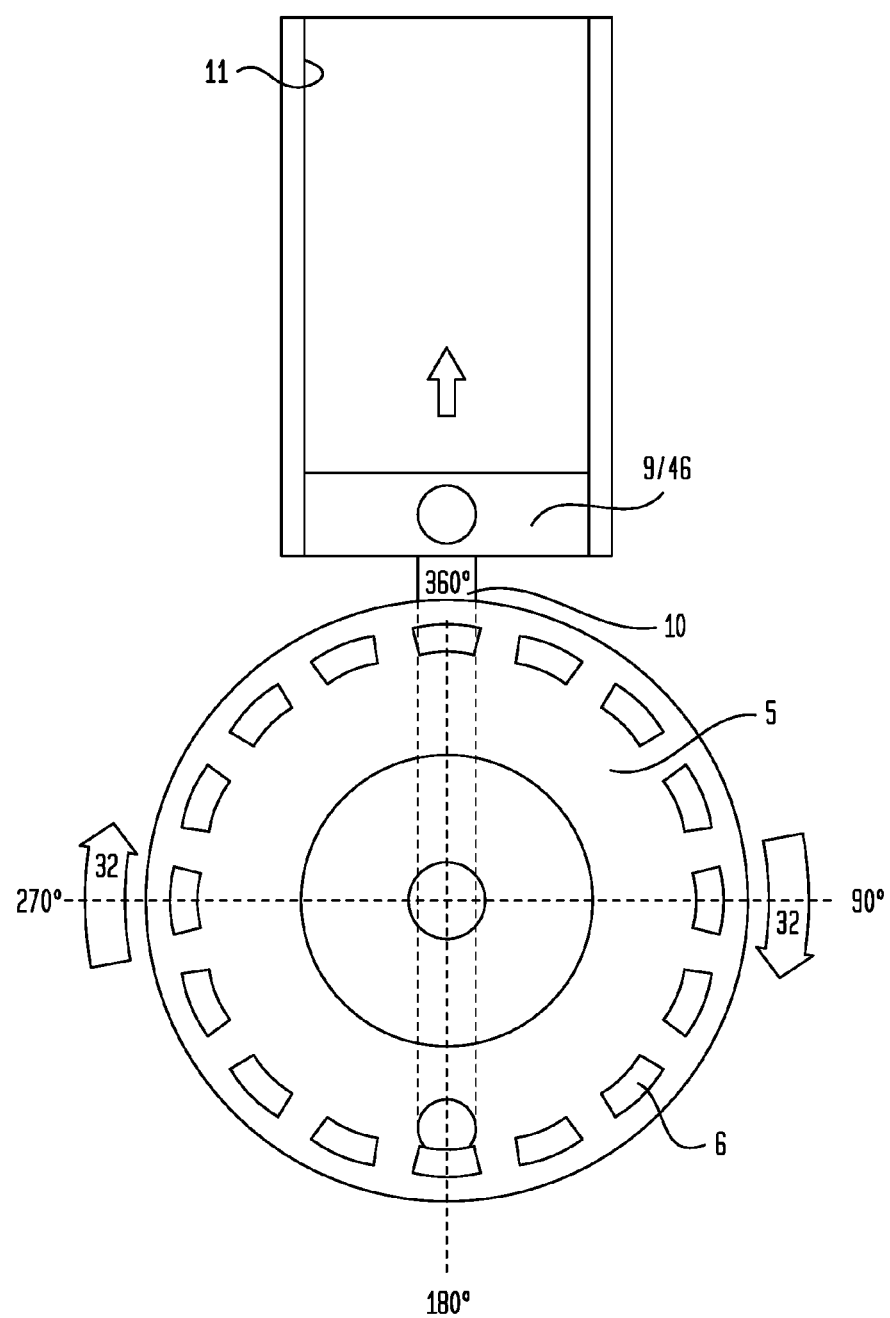

FIG. 11B is an illustration of a start point of a compression stroke of a four-stroke engine, whereby a piston within a cylinder begins at about a bottom dead center position and ends at about a top dead center position, during which a crankshaft and associated rotor travel from about 180° to about 360°.

Figure 11C:
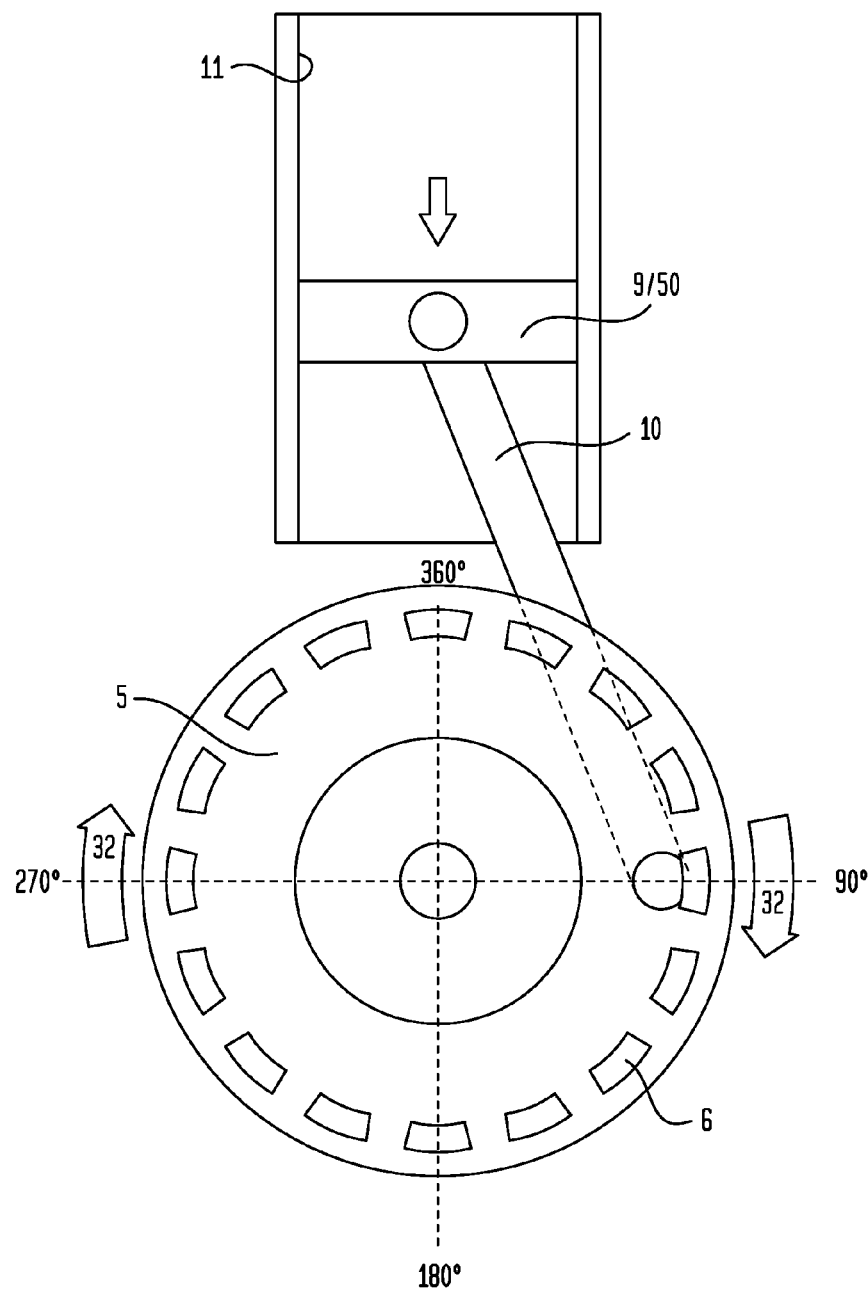

FIG. 11C is an illustration of a midway point of a power stroke of a four-stroke engine, whereby a piston within a cylinder begins at about a top dead center position and ends at about a bottom dead center position, during which a crankshaft and associated rotor travel from about 0° to about 180°.

Figure 11D:
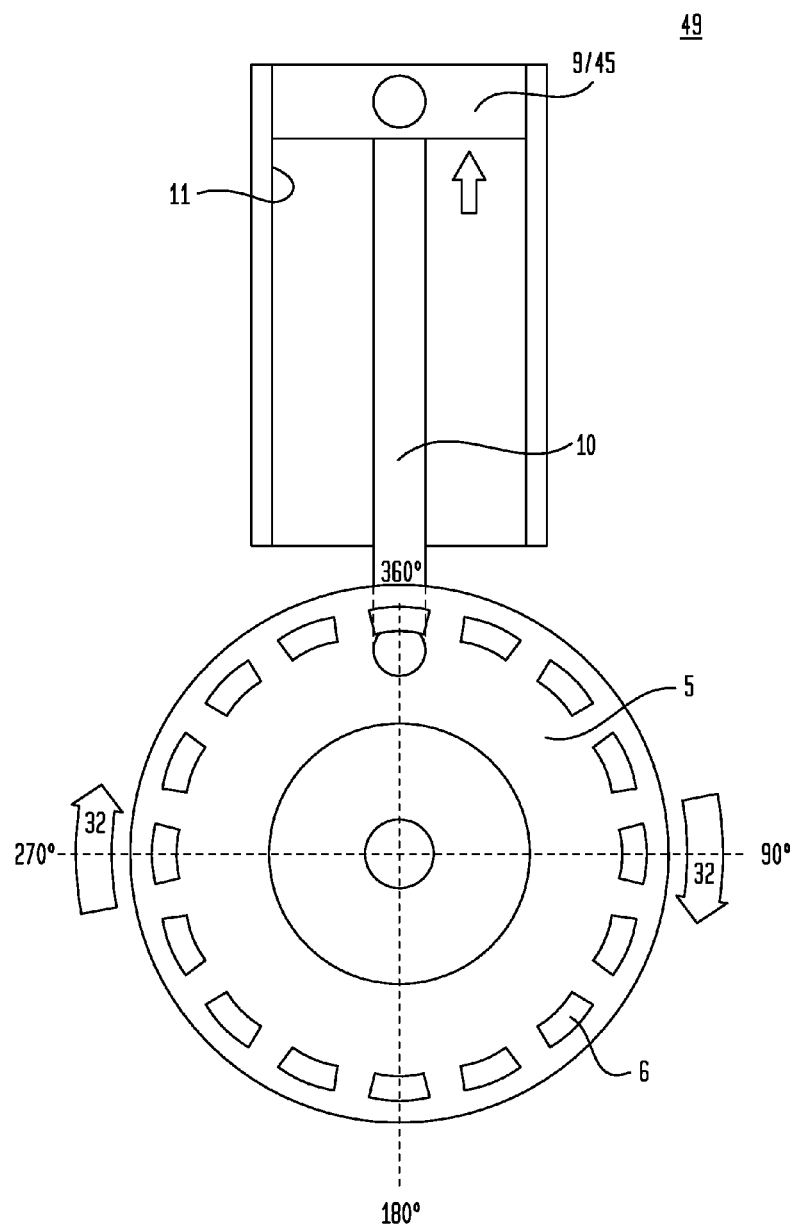

FIG. 11D is an illustration of an end point of an exhaust stroke of a four-stroke engine, whereby a piston within a cylinder begins at about a bottom dead center position and ends at about a top dead center position, during which a crankshaft and associated rotor travel from about 180° to about 360°.

Figure 12:
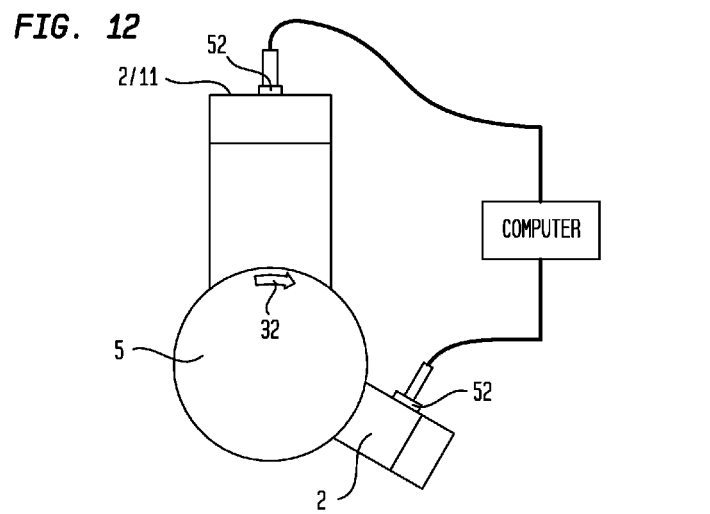

FIG. 12 is an illustration of a vibration sensor operably coupled to a conductive coil, in accordance with a particular embodiment of an electromagnetic rotor drive assembly.

IV. MODE(S) FOR CARRYING OUT THE INVENTION

Figure 1:
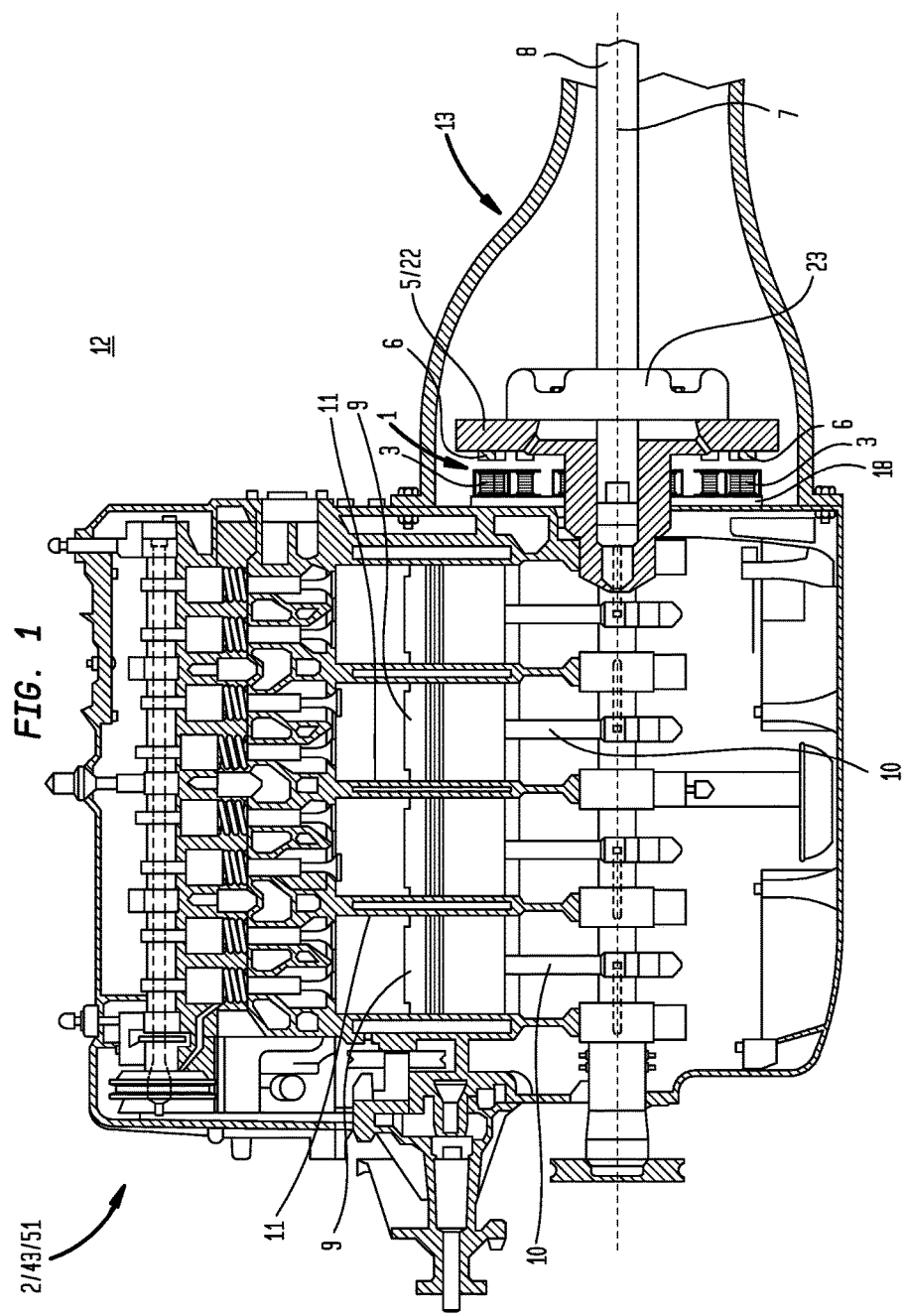
FIG. 1 is a cross-sectional view of a particular embodiment of an electromagnetic rotor drive assembly used with an internal combustion engine, whereby a plurality of conductive coils capable of generating corresponding magnetic fields upon energization are coupled to a stator and a plurality of magnets are coupled to a rotor.

Now referring primarily to FIG. 1, which illustrates a general overview of a particular embodiment of an electromagnetic rotor drive assembly (1) for use with an internal combustion engine (2), whereby the electromagnetic rotor drive assembly (1) provides additional energy input into the internal combustion engine (2), thereby increasing torque of the internal combustion engine (2).

The electromagnetic rotor drive assembly (1) includes a conductive coil (3) capable of generating a magnetic field (4) upon energization, a rotor (5) rotatably mounted proximate the conductive coil (3), and a magnet (6) coupled to the rotor (5), the magnet (6) responsive to the magnetic field (4) to angularly displace the rotor (5), thereby rotating the rotor (5) or accelerating rotation of the rotor (5) about a rotation axis (7).

The rotor (5) fixedly couples to a crankshaft (8), whereby rotation of the crankshaft (8) correspondingly rotates the rotor (5). The crankshaft (8) is rotated by at least one piston (9) operably coupled to the crankshaft (8), for example by a connecting rod (10). The piston (9) is reciprocally disposed within a cylinder (11) of an internal combustion engine (2), whereby the crankshaft (8) converts the reciprocating linear motion of the piston (9) within the cylinder (11) into rotating motion.

The conductive coil (3) is energized at a predetermined time point associated with a position of the piston (9) within the cylinder (11) such that the electromagnetic rotor drive assembly (1) provides additional energy input into the internal combustion engine (2), thereby increasing torque of the internal combustion engine (2), when the conductive coil (3) is energized at the predetermined time point.

As to particular embodiments, the internal combustion engine (2) can be mounted in a vehicle (12) with the torque of the internal combustion engine (2) transmitted to a drivetrain (13) which propels the vehicle (12).

For the purposes of this invention, the term "magnetic field" means the space proximate a magnetic body or an electric current-carrying body in which magnetic forces generated by the body can be present. In a magnetic field, magnetic field lines or lines of magnetic force can be directed toward and away from magnetic poles, for example away from the north magnetic pole and toward the south magnetic pole.

For the purposes of this invention, the term "magnet" means a material that can produce a magnetic field. A magnet can be a permanent magnet, which can be produced from a material capable of generating a persistent magnetic field. Also, a magnet can be a temporary magnet, which can be produced from a material capable of generating a transient magnetic field when influenced by an external magnetic field.

Now referring primarily to FIG. 2A through FIG. 5C, the electromagnetic rotor drive assembly (1) includes a conductive coil (3) capable of generating a magnetic field (4) upon energization. The conductive coil (3) can include a winding (14) disposed about a core (15), whereby each loop of winding (14) about the core (15) can be a turn (16).

The conductive coil (3) can be configured in any of a numerous and wide variety of configurations of varying dimensions which correspond to the numerous directions and magnitudes of the magnetic field (4) which can be generated by the conductive coil (3). As an illustrative example, a conductive coil (3) having a greater winding length (17) and a greater number of turns (16) can have a magnetic field (4) with a greater magnitude than a conductive coil (3) having a lesser winding length (17) and a lesser number of turns (16). As an additional illustrative example, a conductive coil (3) having a core (15) including a metal, for example iron or steel, can have a magnetic field (4) with a greater magnitude than a conductive coil (3) having a core (15) including only gas, for example air.

Now referring primarily to FIG. 3 and FIG. 4, the electromagnetic rotor drive assembly (1) can, but need not necessarily, further include a plurality of conductive coils (3), which can be coupled to a stator (18) in circumferentially spaced apart relation. As an illustrative example, the stator (18) can have a generally circular cross-section and a plurality of conductive coils (3) can be partially or entirely embedded within the stator (18) in circumferentially spaced apart relation proximate a stator outer edge (19) (as shown in the examples of FIG. 2A and FIG. 5A through FIG. 5C). As to other particular embodiments, the plurality of conductive coils (3) can be coupled to a stator surface (20) in circumferentially spaced apart relation proximate the stator outer edge (19) (as shown in the example of FIG. 1) or to the stator outer edge (19) in circumferentially spaced apart relation.

Now referring primarily to FIG. 2B, each of the plurality of conductive coils (3) can have a conductive coil longitudinal axis (21) which passes through the core (15), whereby the magnetic field (4) generated by the conductive coil (3) is directed through the core (15) along the conductive coil longitudinal axis (21). Each conductive core longitudinal axis (21) of the plurality of conductive coils (3) coupled to the stator (18) in circumferentially spaced apart relation can be disposed axially, orthogonally, or radially relative to the rotation axis (7) of the rotor (5) to generate a corresponding magnetic field (4) which can be directed axially, orthogonally, or radially relative to the rotation axis (7) of the rotor (5).

Now referring primarily to FIG. 2A through FIG. 5C, the electromagnetic rotor drive assembly (1) further includes a rotor (5) rotatably mounted proximate the conductive coil (3). The rotor (5) can be configured in any of a numerous and wide variety of configurations of varying dimensions which can rotate about the rotation axis (7) of the rotor (5). As an illustrative example, the rotor (5) can have a generally circular cross-section, whereby the rotor (5) can be configured as a flywheel (22) or a torque convertor (23).

Again referring primarily to FIG. 2A through FIG. 5C, the electromagnetic rotor drive assembly (1) further includes a magnet (6) coupled to the rotor (5). The magnet (6) can be configured in any of a numerous and wide variety of configurations of varying dimensions which correspond to the numerous directions and magnitudes of the magnetic field (4) generated by the magnet (6). Additionally, the magnet (6) can be formed from any of a numerous and wide variety of materials, including one or more ferromagnetic materials, such as iron, nickel, cobalt, or alloys thereof.

Now referring primarily to FIG. 4, the electromagnetic rotor drive assembly (1) can, but need not necessarily, further include a plurality of magnets (6), which can be coupled to the rotor (5) in circumferentially spaced apart relation. As an illustrative example, the rotor (5) can have a generally circular cross-section and a plurality of magnets (6) can be partially or entirely embedded within the rotor (5) in circumferentially spaced apart relation proximate a rotor outer edge (24) (as shown in the examples of FIG. 2A and FIG. 5A through FIG. 5C). As to other particular embodiments, the plurality of magnets (6) can be coupled in circumferentially spaced apart relation to a rotor surface (25) in circumferentially spaced apart relation proximate the rotor outer edge (24) (as shown in the example of FIG. 1) or to the rotor outer edge (24) in circumferentially spaced apart relation.

Now referring primarily to FIG. 2B, each of the magnets (6) can have a magnet longitudinal axis (26) which passes through a pair of opposing magnet ends (27)(28), whereby the magnetic field (4) generated by the magnet (6) is directed along the magnet longitudinal axis (26) about the external surface of the magnet (6). Each magnet longitudinal axis (26) of the plurality of magnets (6) coupled to the rotor (5) in circumferentially spaced apart relation can be disposed axially, orthogonally, or radially relative to the rotation axis (7) of the rotor (5) to generate a corresponding magnetic field (4) which can be directed axially, orthogonally, or radially relative to the rotation axis (7) of the rotor (5).

The magnet (6) is responsive to the magnetic field (4) generated by the conductive coil (3) to angularly displace the rotor (5). Accordingly, a magnetic pole (29) generated by the conductive coil (3) can attract an unlike magnetic pole (29) of the magnet (6) or repel a like magnetic pole (29) of the magnet (6). As a first example, a north magnetic pole (30) generated by the conductive coil (3) can attract a south magnetic pole (31) of the magnet (6) or repel a north magnetic pole (30) of the magnet (6). As a second example, a south magnetic pole (31) generated by the conductive coil (3) can attract a north magnetic pole (30) of the magnet (6) or repel a south magnetic pole (31) of the magnet (6).

The magnetic pole (29) generated by the conductive coil (3) can attract an unlike magnetic pole (29) of a magnet (6) coupled to a rotor (2) rotating about a rotation axis (7) when the magnet (6) traveling in a rotational travel path (32) enters the magnetic field (4) generated by the conductive coil (3). As such, the magnetic pole (29) generated by the conductive coil (3) can attract or forcibly urge the unlike magnetic pole (29) of the magnet (6) toward the magnetic pole (29) generated by the conductive coil (3), thereby accelerating rotation of the rotor (5) about the rotation axis (7).

As an additional illustrative example, the magnetic pole (29) generated by the conductive coil (3) can repel a like magnetic pole (29) of a magnet (6) coupled to a rotor (5) rotating about a rotation axis (7) when the magnet (6) traveling in a rotational travel path (32) disposes within the magnetic field (4) generated by the conductive coil (3). As such, the magnetic pole (29) generated by the conductive coil (3) can repel or forcibly urge the like magnetic pole (29) of the magnet (6) away from the magnetic pole (29) generated by the conductive coil (3), thereby accelerating rotation of the rotor (5) about the rotation axis (7), until the magnet (6) exits the magnetic field (4) generated by the conductive coil (3).

Now referring primarily to FIG. 6 through FIG. 8, the magnetic field (4) can be generated by the conductive coil (3) when an electric current passes through the conductive coil (3), thereby energizing the conductive coil (3). Accordingly, a power source (33) can be operably coupled to the conductive coil (3) to supply the electric current for generating the magnetic field (4) when desired.

The power source (33) can be any of a numerous and wide variety of conventional power sources (33) suitable to provide an electric current to the conductive coil (3), including an alternator (34), a battery (35), or the like, or combinations thereof. As to particular embodiments, a high output alternator (34) can output electrical current to supply both the conductive coil (3) as well as additional power-consuming elements of a system incorporating the electromagnetic rotor drive assembly (1) (as shown in the example of FIG. 7). As to particular embodiments, a capacitor (36) can be coupled to the power source (33). As shown in the example of FIG. 8, the capacitor (36) can recharge between the interruptible energizing of the conductive coil (3).

Now referring primarily to FIG. 9, to control passage of the electric current through the conductive coil (3), the conductive coil (3) can, but need not necessarily, be operably coupled to a timing circuit (37), which can interruptably pass the electric current through the conductive coil (3) to time the energization of the conductive coil (3) and correspondingly, generation of the magnetic field (4).

As to particular embodiments, the timing circuit (37) can, but need not necessarily, be similar to a conventional electronic control module ("ECM") which controls spark timing and fuel injection. Accordingly, an ECM signal can be generated by the ECM based on monitored outputs from the internal combustion engine (2) to facilitate energization or de-energization of the conductive coil (3) at a predetermined time point.

For example, the timing circuit (37) can facilitate energization of the conductive coil (3) to generate a magnetic field (4) when a magnet (6) traveling in a rotational travel path (32) has a predetermined location based upon monitored outputs from the internal combustion engine (2). Alternatively, the timing circuit (37) can facilitate de-energization of the conductive coil (3) when the magnet (6) traveling in the rotational travel path (32) has a predetermined location based upon monitored outputs from the internal combustion engine (2), for example when the magnet (6) exits the magnetic field (4) generated by the conductive coil (3).

As to particular embodiments, the timing circuit (37) can, but need not necessarily, include at least one transistor (38), such as a gated field-effect transistor (FET), to facilitate the energization and de-energization of the conductive coil (3).

Now referring primarily to FIG. 9 through FIG. 10B, as to particular embodiments, the timing circuit (37) can, but need not necessarily, be configured to interruptably pass the electric current through the conductive coil (3) in an electric current flow first direction (39) (as shown by the black-filled arrows in the example of FIG. 9) to correspondingly generate a magnetic pole first direction (40). As an illustrative example, the magnetic pole first direction (40) can be a north-south direction (as shown in the examples of FIG. 10A and FIG. 10B), whereby the north magnetic pole (30) of the magnetic field (4) generated by the conductive coil (3) attracts the south magnetic pole (31) of a magnet (6) traveling in a rotational travel path (32) toward the conductive coil (3) to angularly displace the rotor (5), thereby accelerating rotation of the rotor (5) about the rotation axis (7).

As but one illustrative example, the conductive coil (3) can be energized to interruptably pass the electric current through the conductive coil (3) in an electric current flow first direction (39) to attract the magnet (6) when the magnet (6) is about 15° away from the conductive coil (3) as the magnet (6) travels in the rotational travel path (32) toward the conductive coil (3) (as shown in the example of FIG. 10A); however, the invention need not be so limited. After the magnet (6) continues about the rotational travel path (32), being attracted by the magnetic field (4) generated by the conductive coil (3), and aligns with the conductive coil (3) (as shown in the example of FIG. 10B), the conductive coil (3) can then be de-energized.

Now referring primarily to FIG. 9, FIG. 10C, and FIG. 10D, as to other particular embodiments, the timing circuit (37) can, but need not necessarily, be configured to interruptably pass the electric current through the conductive coil (3) in an electric current flow second direction (41) (as shown by the white-filled arrows in the example of FIG. 9) to correspondingly generate a magnetic pole second direction (42). As an illustrative example, the magnetic pole second direction (42) can be a south-north direction (as shown in the examples of FIG. 10C and FIG. 10D), whereby the north magnetic pole (30) of the magnetic field (4) generated by the conductive coil (3) repels the north magnetic pole (30) of a magnet (6) traveling in a rotational travel path (32) away from the conductive coil (3) to angularly displace the rotor (5), thereby accelerating rotation of the rotor (5) about the rotation axis (7).

As but one illustrative example, the conductive coil (3) can be energized to interruptably pass the electric current through the conductive coil (3) in an electric current flow second direction (41) to repel the magnet (6) when the magnet (6) is generally aligned with the conductive coil (3) as the magnet (6) travels in the rotational travel path (32) away from the conductive coil (3) (as shown in the example of FIG. 10C); however, the invention need not be so limited. After the magnet (6) continues in the rotational travel path (32), being repelled by the magnetic field (4) generated by the conductive coil (3), and exits the magnetic field (4) generated by the conductive coil (3) (as shown in the example of FIG. 10D), the conductive coil (3) can then be de-energized.

Now referring primarily to FIG. 9 through FIG. 10D, as to yet other particular embodiments, the timing circuit (37) can, but need not necessarily, be configured to alternately pass the electric current through the conductive coil (3), alternating between the electric current flow first and second directions (39)(41) and correspondingly, alternately generating magnetic pole first and second directions (40)(42). As described above, the magnetic pole first direction (40) can be a north-south direction (as shown in the examples of FIG. 10A and FIG. 10B), whereby the north magnetic pole (30) of the magnetic field (4) generated by the conductive coil (3) attracts the south magnetic pole (31) of a magnet (6) traveling about a rotational travel path (32) toward the conductive coil (3) to angularly displace the rotor (5), thereby accelerating rotation of the rotor (5) about the rotation axis (7). Also as described above, the magnetic pole second direction (42) can be a south-north direction (as shown in the examples of FIG. 10C and FIG. 10D), whereby the north magnetic pole (30) of the magnetic field (4) generated by the conductive coil (3) repels a north magnetic pole (30) of a magnet (6) traveling in a rotational travel path (32) away from the conductive coil (3) to angularly displace the rotor (5), thereby accelerating rotation of the rotor (5) about the rotation axis (7).

Now referring primarily to FIG. 9, an illustrative timing circuit (37) for use with the present electromagnetic rotor drive assembly (1) is shown. However, the invention need not be so limited, as the conductive coil (3) may be operably coupled to any timing circuit (37) known to one of ordinary skill in the art which can interruptably pass an electric current though the conductive coil (3) to time energization of the conductive coil (3) and correspondingly, generation of the magnetic field (4). In the illustrative example of the timing circuit (37) shown in FIG. 9, the electric current can be passed through the conductive coil (3) in the electric current flow first direction (39) (as shown by the black-filled arrows) by allowing the electric current to flow through only gated field-effect transistors Q1 and Q2. Conversely, the electric current can be passed through the conductive coil (3) in the electric current flow second direction (41) (as shown by the white-filled arrows) by allowing the electric current to flow through only gated field-effect transistors Q4 and Q5.

Again referring primarily to FIG. 9, as to particular embodiments, the timing circuit (37) can, but need not necessarily, further be configured to shunt residual electric current to ground after the electric current flows in each of the electric current flow first and second directions (39)(41). In the illustrative example of the timing circuit (37) shown in FIG. 9, after the electric current has passed through the conductive coil (3) in the electric current flow first direction (39) (as shown by the black-filled arrows), residual electric current within the conductive coil (3) can be shunted to ground (as shown by the line-filled arrows) by allowing the residual electric current to flow through only gated field-effect transistors Q1 and Q3. Following, after the electric current has passed through the conductive coil (3) in the electric current flow second direction (41) (as shown by the white-filled arrows), residual electric current within the conductive coil (3) can be shunted to ground (as shown by the dot-filled arrows) by allowing the residual electric current to flow through only gated field-effect transistors Q4 and Q6.

Now referring primarily to FIG. 3 and FIG. 4, as to particular embodiments, n conductive coils (3) can be coupled to the stator (18) in circumferentially spaced apart relation and n magnets (6) can be coupled to the rotor (5) in circumferentially spaced apart relation such that each magnet (6) operably aligns with one conductive coil (3). Accordingly, as each magnet (6) travels in the rotational travel path (32), each magnet (6) simultaneously enters and exits the magnetic field (4) generated by a proximately aligned conductive coil (3) to angularly displace the rotor (5), thereby accelerating rotation of the rotor (5) about the rotation axis (7).

Now referring primarily to FIG. 1 through FIG. 5C, the rotor (5) fixedly couples to a crankshaft (8), whereby rotation of the crankshaft (8) correspondingly rotates the rotor (5). The crankshaft (8) is rotated by at least one piston (9) operably coupled to the crankshaft (8), for example by a connecting rod (10). The piston (9) is reciprocally disposed within a cylinder (11) of an internal combustion engine (2), whereby the crankshaft (8) converts the reciprocating linear motion of the piston (9) within the cylinder (11) into rotating motion.

Now referring primarily to FIG. 11A through FIG. 11D, as to particular embodiments, the electromagnetic rotor drive assembly (1) can be used with an internal combustion engine (2) configured as a four-stroke engine (43), in which a piston (9) completes four discrete strokes within a cylinder (11) in a thermodynamic cycle; however, the invention need not be limited to a four-stroke engine (43).

The four strokes of a four-stroke engine (43) include an intake stroke (44) (as shown in the example of FIG. 11A), in which the piston (9) begins at about a top dead center position (45) and ends at about a bottom dead center position (46) (as shown in the example of FIG. 11B), during which the crankshaft (8) and associated rotor (5) travel from about 0° to about 180°; a compression stroke (47) (as shown in the example of FIG. 11C), in which the piston (9) begins at about the bottom dead center position (46) and ends at about the top dead center position (45) (as shown in the example of FIG. 11D), during which the crankshaft (8) and associated rotor (5) travel from about 180° to about 360°; a power stroke (48) (as shown in the example of FIG. 11A), in which the piston (9) again begins at about the top dead center position (45) and ends at about the bottom dead center position (46) (as shown in the example of FIG. 11B), during which the crankshaft (8) and associated rotor (5) again travel from about 0° to about 180°; and an exhaust stroke (49) (as shown in the example of FIG. 11C), in which the piston (9) again begins at about the bottom dead center position (46) and ends at about the top dead center position (45) (as shown in the example of FIG. 11D), during which the crankshaft (8) and associated rotor (5) again travel from about 180° to about 360°.

Again referring primarily to FIG. 11A through FIG. 11D, the conductive coil (3) can be energized at a predetermined time point associated with a position of the piston (9) within the cylinder (11).

As a first illustrative example, the predetermined time point can be associated with the bottom dead center position (46) of the piston (9) within the cylinder (11).

As a second illustrative example, the predetermined time point can be associated with the bottom dead center position (46) of the piston (9) within the cylinder (11) before the piston (9) begins the compression stroke (47).

As a third illustrative example, the predetermined time point can be associated with the top dead center position (45) of the piston (9) within the cylinder (11).

As a fourth illustrative example, the predetermined time point can be associated with the top dead center position (45) of the piston (9) within the cylinder (11) before the piston (9) begins the power stroke (48).

When the piston (9) is disposed in the top or bottom dead center position (45)(46), the piston (9) may be subject to a lesser amount of friction than when the piston (8) is travelling between the top and bottom dead center positions (45)(46), the friction resulting from an outer circumference of the piston (9) or a piston ring moving along an internal surface of the cylinder (11). Thus, when the piston (9) disposes in the top or bottom dead center position (45)(46), a lesser amount of energy may be needed by the internal combustion engine (2) relative to when the piston (9) is travelling between the top and bottom dead center positions (45)(46).

As a fifth illustrative example, the predetermined time point can be associated with a middle position (50) of the piston (9) within the cylinder (11), whereby the middle position (50) can be any position between the top and bottom dead center positions (45)(46).

It is to be understood that the invention is not limited to the predetermined time points associated with the positions of the piston (9) within the cylinder (11) described above, as the electromagnetic rotor drive assembly (1) can be employed to provide additional energy input into an internal combustion engine (2) during any one of the strokes of the piston (9) within the cylinder (11) and at any position of the piston (9) within the cylinder (11) and correspondingly, at any associated position of the crankshaft (8) and rotor (5), depending upon when it is desirable to provide additional energy input into the internal combustion engine (2). Upon the additional energy input from the electromagnetic rotor drive assembly (1), the rotational speed of the rotor (5) and associated crankshaft (8) can be greater than the rotational speed of the rotor (5) and associated crankshaft (8) without the additional energy input from the electromagnetic rotor drive assembly (1).

Now referring primarily to FIG. 1, FIG. 2A, and FIG. 5A through FIG. 5C, the electromagnetic rotor drive assembly (1) can be configured in various configurations and in numerous positions, depending upon the application. For example, one or more magnets (6) can be coupled to the rotor (5) and one or more conductive coils (3) can be coupled to the stator (18) (as shown in the examples of FIG. 1, FIG. 2A, and FIG. 5A). Conversely, one or more magnets (6) can be coupled to the stator (18) and one or more conductive coils (3) can be coupled to the rotor (5) (as shown in the examples of FIG. 5B and FIG. 5C).

Regarding the positioning of the stator (18) and the rotor (5) within the electromagnetic rotor drive assembly (1) coupled to an internal combustion engine (2), the stator (18) can be proximate the engine block (51) and the rotor (5) can be distal from the engine block (51) (as shown in the examples of FIG. 1, FIG. 2A, and FIG. 5C). Alternatively, the rotor (5) can be proximate the engine block (51) and the stator (18) can be distal from the engine block (51) (as shown in the examples of FIG. 5A and FIG. 5B).

Now referring primarily to FIG. 12, the electromagnetic rotor drive assembly (1) can, but need not necessarily, further include a sensor (52), for example a vibration sensor (52), operably coupled to the conductive coil (3). The vibration sensor (52) can be configured to generate a vibration sensor signal upon an amount of vibration of the internal combustion engine (2), whereby the vibration sensor signal operably couples to the conductive coil (3) to facilitate energization of the conductive coil (3) to counter the amount of vibration of the internal combustion engine (2), thereby smoothing out the vibrations of the internal combustion engine (2).

A method of making a particular embodiment of an electromagnetic rotor drive assembly (1) for use with an internal combustion engine (2) can include providing a conductive coil (3) capable of generating a magnetic field (4) upon energization; rotatably mounting a rotor (5) proximate the conductive coil (3); and coupling a magnet (6) to the rotor (5), the magnet (6) responsive to the magnetic field (4) to angularly displace the rotor (5); whereby the rotor (5) fixedly couples to a crankshaft (8) rotated by at least one piston (9) reciprocally disposed within a cylinder (11); and whereby the conductive coil (3) is energized at a predetermined time point associated with a position of the piston (9) within the cylinder (11). As to particular embodiments, the electromagnetic rotor drive assembly (1) can provide additional energy input into the internal combustion engine (2) when the conductive coil (3) is energized at the predetermined time point.

The method of making the electromagnetic rotor drive assembly (1) can, but need not necessarily, further include coupling a plurality of the conductive coils (3) to a stator (18) in circumferentially spaced apart relation.

The method of making the electromagnetic rotor drive assembly (1) can, but need not necessarily, further include embedding the plurality of conductive coils (3) within the stator (18) in circumferentially spaced apart relation proximate a stator outer edge (19).

The method of making the electromagnetic rotor drive assembly (1) can, but need not necessarily, further include coupling the plurality of conductive coils (3) to a stator surface (20) in circumferentially spaced apart relation proximate a stator outer edge (19).

The method of making the electromagnetic rotor drive assembly (1) can, but need not necessarily, further include disposing each conductive coil longitudinal axis (21), which passes through a core (15) of the conductive coil (3), in a disposition relative to a rotation axis (7) of the rotor (5), the disposition selected from the group consisting of: axially, orthogonally, and radially.

The method of making the electromagnetic rotor drive assembly (1) can, but need not necessarily, further include configuring the rotor (5) as a flywheel (22).

The method of making the electromagnetic rotor drive assembly (1) can, but need not necessarily, further include coupling a plurality of magnets (6) to the rotor (5) in circumferentially spaced apart relation.

The method of making the electromagnetic rotor drive assembly (1) can, but need not necessarily, further include embedding the plurality of magnets (6) within the rotor (5) in circumferentially spaced apart relation proximate a rotor outer edge (24).

The method of making the electromagnetic rotor drive assembly (1) can, but need not necessarily, further include coupling the plurality of magnets (6) to a rotor surface (25) in circumferentially spaced apart relation proximate a rotor outer edge (24).

The method of making the electromagnetic rotor drive assembly (1) can, but need not necessarily, further include disposing each magnet longitudinal axis (26), which passes through a pair of opposing magnet ends (27)(28) of the magnet (6), in a disposition relative to a rotation axis (7) of the rotor (5), the disposition selected from the group consisting of: axially, orthogonally, and radially.

The method of making the electromagnetic rotor drive assembly (1) can, but need not necessarily, further include operably coupling the conductive coil (3) to a timing circuit (37) which interruptably passes electric current through the conductive coil (3) to time the energization of the conductive coil (3) and correspondingly, generation of the magnetic field (4).

The method of making the electromagnetic rotor drive assembly (1) can, but need not necessarily, further include configuring the timing circuit (37) to include at least one transistor (38) which facilitates the energization of the conductive coil (3) and correspondingly, generation of the magnetic field (4).

The method of making the electromagnetic rotor drive assembly (1) can, but need not necessarily, further include configuring the timing circuit (37) to alternately pass the electric current through the conductive coil (3), alternating between electric current flow first and second directions (39)(41) and correspondingly, alternately generating magnetic pole first and second directions (40)(42).

The method of making the electromagnetic rotor drive assembly (1) can, but need not necessarily, further include configuring the internal combustion engine (2) as a four-stroke engine (43).

The method of making the electromagnetic rotor drive assembly (1) can, but need not necessarily, further include associating the predetermined time point with a bottom dead center position (46) of the piston (9) within the cylinder (11).

The method of making the electromagnetic rotor drive assembly (1) can, but need not necessarily, further include associating the predetermined time point with the bottom dead center position (46) of the piston (9) within the cylinder (11) before the piston (9) begins a compression stroke (47).

The method of making the electromagnetic rotor drive assembly (1) can, but need not necessarily, further include associating the predetermined time point with a top dead center position (45) of the piston (9) within the cylinder (11).

The method of making the electromagnetic rotor drive assembly (1) can, but need not necessarily, further include associating the predetermined time point with the top dead center position (45) of the piston (9) within the cylinder (11) before the piston (9) begins a power stroke (48).

The method of making the electromagnetic rotor drive assembly (1) can, but need not necessarily, further include operably coupling a vibration sensor (52) to the conductive coil (3), the vibration sensor (52) configured to generate a vibration sensor signal upon an amount of vibration of the internal combustion engine (2); the vibration sensor signal operably coupled to the conductive coil (3) to facilitate the energization of the conductive coil (3) to counter the amount of vibration of the internal combustion engine (2).

A method of using a particular embodiment of an electromagnetic rotor drive assembly (1) to provide additional energy input into an internal combustion engine (2) can include obtaining the electromagnetic rotor drive assembly (1) including a conductive coil (3) capable of generating a magnetic field (4) upon energization; a rotor (5) rotatably mounted proximate the conductive coil (3); and a magnet (6) coupled to the rotor (5), the magnet (6) responsive to the magnetic field (4) to angularly displace the rotor (5); whereby the rotor (5) fixedly couples to a crankshaft (8) rotated by at least one piston (9) reciprocally disposed within a cylinder (11); and whereby the conductive coil (3) is energized at a predetermined time point associated with a position of the piston (9) within the cylinder (11); and energizing the conductive coil (3) at the predetermined time point associated with the position of the piston (9) within the cylinder (11).

As to particular embodiments, the electromagnetic rotor drive assembly (1) can provide additional energy input into the internal combustion engine (2) when the conductive coil (3) is energized at the predetermined time point.

The method of using the electromagnetic rotor drive assembly (1) can, but need not necessarily, further include generating a rotational speed of the rotor (5) which is greater than the rotational speed of the rotor (5) without the additional energy input.

The method of using the electromagnetic rotor drive assembly (1) can, but need not necessarily, further include increasing torque of the internal combustion engine (2).

The method of using the electromagnetic rotor drive assembly (1) can, but need not necessarily, further include operating a timing circuit (37) operably coupled to the conductive coil (3) to interruptably passes electric current through the conductive coil (3) to time the energization of the conductive coil (3) and correspondingly, generation of the magnetic field (4).

The method of using the electromagnetic rotor drive assembly (1) can, but need not necessarily, further include operating the timing circuit (37) to alternately pass the electric current through the conductive coil (3), the electric current alternating between electric current flow first and second directions (39)(41) and correspondingly, alternately generating magnetic pole first and second directions (40) (42).

The method of using the electromagnetic rotor drive assembly (1) can, but need not necessarily, further include associating the predetermined time point with a bottom dead center position (46) of the piston (9) within the cylinder (11).

The method of using the electromagnetic rotor drive assembly (1) can, but need not necessarily, further include associating the predetermined time point with the bottom dead center position (46) of the piston (9) within the cylinder (11) before the piston (9) begins a compression stroke (47).

The method of using the electromagnetic rotor drive assembly (1) can, but need not necessarily, further include associating the predetermined time point with a top dead center position (45) of the piston (9) within the cylinder (11).

The method of using the electromagnetic rotor drive assembly (1) can, but need not necessarily, further include associating the predetermined time point with the top dead center position (45) of the piston (9) within the cylinder (11) before the piston (9) begins a power stroke (48).

As can be easily understood from the foregoing, the basic concepts of the present invention may be embodied in a variety of ways. The invention involves numerous and varied embodiments of an electromagnetic rotor drive assembly and methods for making and using such electromagnetic rotor drive assemblies, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "rotor" should be understood to encompass disclosure of the act of "rotating"—whether explicitly discussed or not—and, conversely, were there effectively disclosure of the act of "rotating", such a disclosure should be understood to encompass disclosure of a "rotator" and even a "means for rotating". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the electromagnetic rotor drive assemblies herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice versa as necessary to define the matter for which protection is sought by this application or by any subsequent application or continuation, division, or continuation in part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An electromagnetic rotor drive assembly for use with an internal combustion engine, comprising:
    a conductive coil coupled to a stator, said conductive coil capable of generating a magnetic field upon energization;
    a rotor rotatably mounted proximate said conductive coil;
    a magnet coupled to said rotor, said magnet responsive to said magnetic field to angularly displace said rotor; and
    a timing circuit operably coupled to said conductive coil;
    wherein said timing circuit is configured to alternately pass said electric current through said conductive coil, said electric current alternating between electric current flow first and second directions and correspondingly, alternately generating magnetic pole first and second directions;
    wherein said rotor fixedly couples to a crankshaft rotated by at least one piston reciprocally disposed within a cylinder; and
    wherein said conductive coil is energized at a predetermined time point associated with a position of said piston within said cylinder.

2. The electromagnetic rotor drive assembly of claim 1, wherein said electromagnetic rotor drive assembly provides additional energy input into said internal combustion engine when said conductive coil is energized at said predetermined time point.

3. The electromagnetic rotor drive assembly of claim 2, further comprising a plurality of said conductive coils coupled to said stator in circumferentially spaced apart relation.

4. The electromagnetic rotor drive assembly of claim 3, further comprising a plurality of said magnets coupled to said rotor in circumferentially spaced apart relation.

5. The electromagnetic rotor drive assembly of claim 1, further comprising:
    a vibration sensor operably coupled to said conductive coil, said vibration sensor configured to generate a vibration sensor signal upon an amount of vibration of said internal combustion engine;
    said vibration sensor signal operably coupled to said conductive coil to facilitate said energization of said conductive coil to counter said amount of vibration of said internal combustion engine.

6. The electromagnetic rotor drive assembly of claim 1, wherein said electric current flow first direction and correspondingly, said magnetic pole first direction attracts said magnet traveling in a rotational travel path toward said conductive coil to angularly displace said rotor.

7. The electromagnetic rotor drive assembly of claim 6, wherein attraction of said magnet traveling in said rotational travel path toward said conductive coil accelerates rotation of said rotor.

8. The electromagnetic rotor drive assembly of claim 6, wherein said electric current flow second direction and correspondingly, said magnetic pole second direction repels said magnet traveling in said rotational travel path away from said conductive coil to angularly displace said rotor.

9. The electromagnetic rotor drive assembly of claim 8, wherein repulsion of said magnet traveling in said rotational travel path away from said conductive coil accelerates rotation of said rotor.

10. The electromagnetic rotor drive assembly of claim 1, wherein said predetermined time point is associated with a bottom dead center position of said piston within said cylinder.

11. The electromagnetic rotor drive assembly of claim 1, wherein said predetermined time point is associated with a top dead center position of said piston within said cylinder.

12. An electromagnetic rotor drive assembly for use with an internal combustion engine, comprising:
    a conductive coil capable of generating a magnetic field upon energization;
    a rotor rotatably mounted proximate said conductive coil; and
    a magnet coupled to said rotor, said magnet responsive to said magnetic field to angularly displace said rotor;

wherein said rotor fixedly couples to a crankshaft rotated by at least one piston reciprocally disposed within a cylinder;

wherein said conductive coil is energized at a predetermined time point associated with a position of said piston within said cylinder; and wherein said predetermined time point is associated with a bottom dead center position of said piston within said cylinder.

13. The electromagnetic rotor drive assembly of claim 12, wherein said predetermined time point is associated with said bottom dead center position of said piston within said cylinder before said piston begins a compression stroke.

14. The electromagnetic rotor drive assembly of claim 12, wherein said electromagnetic rotor drive assembly provides additional energy input into said internal combustion engine when said conductive coil is energized at said predetermined time point.

15. The electromagnetic rotor drive assembly of claim 14, further comprising a plurality of said conductive coils coupled to a stator in circumferentially spaced apart relation.

16. The electromagnetic rotor drive assembly of claim 15, further comprising a plurality of said magnets coupled to said rotor in circumferentially spaced apart relation.

17. An electromagnetic rotor drive assembly for use with an internal combustion engine, comprising:

a conductive coil capable of generating a magnetic field upon energization;

a rotor rotatably mounted proximate said conductive coil; and a magnet coupled to said rotor, said magnet responsive to said magnetic field to angularly displace said rotor;

wherein said rotor fixedly couples to a crankshaft rotated by at least one piston reciprocally disposed within a cylinder;

wherein said conductive coil is energized at a predetermined time point associated with a position of said piston within said cylinder; and wherein said predetermined time point is associated with a top dead center position of said piston within said cylinder.

18. The electromagnetic rotor drive assembly of claim 17, wherein said predetermined time point is associated with said top dead center position of said piston within said cylinder before said piston begins a power stroke.

19. The electromagnetic rotor drive assembly of claim 17, wherein said electromagnetic rotor drive assembly provides additional energy input into said internal combustion engine when said conductive coil is energized at said predetermined time point.

20. The electromagnetic rotor drive assembly of claim 19, further comprising a plurality of said conductive coils coupled to a stator in circumferentially spaced apart relation.

21. The electromagnetic rotor drive assembly of claim 20, further comprising a plurality of said magnets coupled to said rotor in circumferentially spaced apart relation.

* * * * *